United States Patent
Zhang et al.

(10) Patent No.: US 10,445,567 B2
(45) Date of Patent: Oct. 15, 2019

(54) PEDESTRIAN HEAD IDENTIFICATION METHOD AND SYSTEM

(71) Applicant: SHENZHEN UNIVERSITY, Shenzhen, Guangdong (CN)

(72) Inventors: Yong Zhang, Guangdong (CN); Lei Liu, Guangdong (CN); Zehong Chen, Guangdong (CN); Dongning Zhao, Guangdong (CN); Yanshan Li, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 162 days.

(21) Appl. No.: 15/832,715

(22) Filed: Dec. 5, 2017

(65) Prior Publication Data
US 2018/0181803 A1 Jun. 28, 2018

Related U.S. Application Data

(63) Continuation of application No. PCT/CN2016/112383, filed on Dec. 27, 2016.

(51) Int. Cl.
| | |
|---|---|
| *G06K 9/52* | (2006.01) |
| *G06K 9/00* | (2006.01) |
| *G06K 9/32* | (2006.01) |
| *G06T 7/11* | (2017.01) |
| *G06T 7/246* | (2017.01) |
| *G06T 7/194* | (2017.01) |
| *G06T 7/136* | (2017.01) |

(52) U.S. Cl.
CPC ..... *G06K 9/00369* (2013.01); *G06K 9/00234* (2013.01); *G06K 9/00778* (2013.01); *G06K 9/3241* (2013.01); *G06T 7/11* (2017.01); *G06T 7/136* (2017.01); *G06T 7/194* (2017.01); *G06T 7/246* (2017.01); *G06T 2207/10016* (2013.01); *G06T 2207/10028* (2013.01); *G06T 2207/30196* (2013.01)

(58) Field of Classification Search
CPC .......... G06K 9/00362–00369; G06K 9/00778; G06T 2207/10028; G06T 2207/30196
See application file for complete search history.

(56) References Cited

U.S. PATENT DOCUMENTS

2015/0332466 A1\* 11/2015 Hu ..................... G06K 9/00268
382/103

OTHER PUBLICATIONS

Maik Boltes et al., "Collecting Pedestrian Trajectories", Neurocomputing, vol. 100, Jan. 16, 2013, pp. 1-15. (Year: 2013).\*

\* cited by examiner

*Primary Examiner* — Brian Werner (57) ABSTRACT

The disclosure provides a pedestrian head identification method and a pedestrian head identification system. The method comprises the following steps of: S1: collecting a depth image of a target region, and extracting a foreground image from the depth image; S2: extracting all Regions of Interest (ROI) from the foreground image; and S3: constructing concentric circles with each pixel point in each ROI region as a center to calculate a probability that the current pixel point belongs to the pixel points in a head region, obtaining the probability value of each pixel point in each ROI region, comparing the probability value of each pixel point in each ROI region with a preset first threshold, and filtering the pixel points with the probability value smaller than the first threshold, wherein the rest pixel points existent in regional form are points of the head region, and each region is an identified head.

4 Claims, 4 Drawing Sheets

PEDESTRIAN HEAD IDENTIFICATION METHOD AND SYSTEM

CROSS REFERENCE TO RELATED APPLICATION

The present application is a Continuation Application of PCT application No. PCT/CN2016/112383 filed on Dec. 27, 2016. All the above are hereby incorporated by reference.

TECHNICAL FIELD

The disclosure relates to the technical field of image processing, and in particular to a pedestrian head identification method and a pedestrian head identification system.

BACKGROUND

Computer vision technologies which are advancing by leaps and bounds promote the rapid development of the entire industry chain of smart video monitoring, and huge business opportunities are created to inspire more and more enterprises and research institutions to plunge into the research and development of the frontier technology of this industry. On this background, a pedestrian detection technology based on image processing and mode identification has gradually developed, and this technology is gradually playing a significant role in the field of smart video monitoring.

Present pedestrian head identification methods that are based on image processing generally are realized by identifying some physical features of pedestrians, for example, the color of hair, the contour of head or the model of shoulder. However, these features are not representative, for example, some colors of dyed hair cannot be well identified, the color of the hair will change with light illumination and other factors, moreover, the clothes worn on the body having a similar color to the hair or the wearing of a hat and other conditions will interfere the identification, causing a low identification accuracy. When the contours of heads are extracted using a camera, the contours of heads will change with the movement of the pedestrians, so that the contours are not uniform. The head and shoulder model is obtained as the camera shoots downwards obliquely, thus it is easy to produce shielding and the identification is inaccurate.

SUMMARY

The technical problem to be solved by the disclosure is providing a pedestrian head identification method and a pedestrian head identification system, through which pedestrian heads may be identified smartly and efficiently by way of image processing.

The disclosure provides a pedestrian head identification method, which includes the following steps of:

S1: acquiring a depth image collected from a target region by a depth camera as the depth camera is perpendicularly aligned to a ground, and extracting a foreground image from the depth image;

S2: extracting potential regions of all heads from the foreground image to serve as Regions of Interest (ROI); and S3: constructing concentric circles with each pixel point in each ROI region as a center to calculate a probability that the current pixel point belongs to the pixel points in a head region, obtaining the probability value of each pixel point in each ROI region, comparing the probability value of each pixel point in each ROI region with a preset first threshold, and filtering the pixel points with the probability value smaller than the first threshold, wherein the rest pixel points existent in regional form are points of the head region, and each region is an identified head.

Further, the step S1 specifically includes collecting the depth image of the target region using the depth camera which is perpendicularly aligned to the ground, obtaining a pixel value f(x,y) of a point with coordinates of (x,y) in the depth image, comparing the pixel value f(x,y) with a pixel value bg(x,y) of a point with coordinates of (x,y) that is obtained by background modeling in advance, and obtaining, in combination with a formula, a pixel value mask(x,y) of a point with coordinates of (x,y) in the foreground image.

Herein, the formula is:

$$\text{mask}(x, y) = \begin{cases} 0 & |f(x, y) - bg(x, y)| < Tbg \\ f(x, y) & \text{others} \end{cases};$$

where Tbg is a distinguishing threshold for the background model and the foreground image.

The above process of obtaining the pixel value bg(x,y) of the point with coordinates of (x,y) by background modeling in advance specifically includes: collecting a plurality of background images of the target region, and averaging the pixel values of the point with coordinates of (x,y) in the plurality of background images.

The pixel value of the point with coordinates of (x,y) is a relative distance between a corresponding point of the current point in the target region and the depth camera.

Further, the step S2 specifically includes the following steps of:

S21: taking each pixel point P in the foreground image as a central point to calculate, according to a formula, an average m of the pixel values of the points in eight neighborhoods thereof;

the formula being:

$$m = \frac{\sum_{k=1}^{8} p(k)}{8};$$

where p(k) is the pixel value of the point in the neighborhood;

S22: if the absolute value d of the difference between the average m of the neighborhood and the pixel value p of the central point is less than a preset second threshold Tm, calculating a variance v of the neighborhood according to a variance formula;

the variance formula being:

$$v = \sum_{k=1}^{8}(p(k)-m)^2/8;$$

S23: if the variance v is less than a preset third threshold Tv, determining that the neighborhood belongs to the ROI region.

Further, the step S3 specifically includes the following steps of:

S31: constructing concentric circles with each pixel point in each ROI region as a center, the radius of the inner circle of the concentric circles being r and the radius of the outer circle being n×r;

where $$r = \frac{1}{2}R,$$

R being the average number of the pixel points from a central point of a head region to the edge of the head region, which is obtained by statistics, 1.2≤n≤1.7;

S32: sorting the pixel values of the pixel points taken in the inner circle, and recording a sequence ArrayInner formed by the pixel values of the pixel points taken in the region of the inner circle, the length of the sequence ArrayInner being lengthInner, wherein the point of the maximum pixel value has the pixel value of NinnerMax; sorting the pixel values of the pixel points taken in the region between the inner circle and the outer circle, and recording a sequence ArrayOuter formed by the pixel values of the pixel points taken in the region between the inner circle and the outer circle, the length of the sequence ArrayOuter being lenghtOuter, wherein the point of the minimum pixel value has the pixel value of NouterMin;

wherein the pixel points taken above are uniformly distributed in respective regions, and the number lengthInner of the pixel points taken in the region of the inner circle is equal to the number lengthOuter of the pixel points taken in the region between the inner circle and the outer circle;

S33: calculating, in the sequence ArrayOuter, the number of the points whose pixel values are less than NinnerMax as Numb_1; calculating, in the sequence ArrayInner, the number of the points whose pixel values are greater than NouterMin as Numb_2; and calculating, according to a formula, the probability L that the current pixel point belongs to the pixel points in a head region, and recording the probability value;

the formula being:

L=(lengthInner+lengthOuter−Num_1−Num_2)/(lengthInner+lengthOuter);

S34: increasing the radius of the inner circle of the concentric circles to $r_{new}$, $r_{new}=r+r\times\alpha$, where α represents an increase rate of the radius r of the inner circle of the concentric circles, 0<α<1, at this time, the radius of the outer circle being n×rnew; when $r_{new}\leq 2R$, setting $r=r_{new}$ and repeating the above steps S32 to S34 to calculate the probability that each pixel point in the ROI region belongs to the pixel points in a head region, and recording the probability value; taking a recorded maximum probability of each pixel point as the final probability that the current pixel point belongs to the pixel points in the head region; and, when $r_{new}>2R$, going to step S35;

S35: comparing the final probability of each pixel point with the first threshold, and filtering the pixel points with the final probability smaller than the first threshold, wherein the rest pixel points existent in regional form are points of the head region, and each region is an identified head.

The disclosure further provides a pedestrian head identification system, which includes the following:

a foreground image extraction module, which is configured to acquire a depth image collected from a target region by a depth camera as the depth camera is perpendicularly aligned to a ground and to extract a foreground image from the depth image;

an ROI region extraction module, which is configured to extract potential regions of all heads from the foreground image to serve as ROI regions; and a head identification module, which is configured to identify a head region by constructing concentric circles, more specifically, to construct concentric circles with each pixel point in each ROI region as a center to calculate a probability that the current pixel point belongs to the pixel points in a head region, obtain the probability value of each pixel point in each ROI region, compare the probability value of each pixel point in each ROI region with a preset first threshold, and filter the pixel points with the probability value smaller than the first threshold, wherein the rest pixel points existent in regional form are points of the head region, and each region is an identified head.

Further, the foreground image extraction module is specifically configured to: collect the depth image of the target region using the depth camera which is perpendicularly aligned to the ground, obtain a pixel value f(x,y) of a point with coordinates of (x,y) in the depth image, compare the pixel value f(x,y) with a pixel value bg(x,y) of a point with coordinates of (x,y) that is obtained by background modeling in advance, and obtain, in combination with a formula, a pixel value mask(x,y) of a point with coordinates of (x,y) in the foreground image;

The formula is:

$$\text{mask}(x, y) = \begin{cases} 0 & |f(x, y) - bg(x, y)| < Tbg \\ f(x, y) & \text{others} \end{cases};$$

where Tbg is a distinguishing threshold for the background model and the foreground image.

The above process of obtaining the pixel value bg(x,y) of the point with coordinates of (x,y) by background modeling in advance specifically includes: collecting a plurality of background images of the target region, and averaging the pixel values of the point with coordinates of (x,y) in the plurality of background images.

The pixel value of the point with coordinates of (x,y) is a relative distance between a corresponding point of the current point in the target region and the depth camera.

Further, the ROI region extraction module specifically includes:

an average calculation submodule, which is configured to take each pixel point P in the foreground image as a central point to calculate, according to a formula, an average m of the pixel values of the points in eight neighborhoods thereof;

the formula being:

$$m = \frac{\sum_{k=1}^{8} p(k)}{8};$$

where p(k) is the pixel value of the point in the neighborhood;

a variance calculation submodule, which is configured to: if the absolute value d of the difference between the average m of the neighborhood and the pixel value p of the central point is less than a preset second threshold Tm, calculate a variance v of the neighborhood according to a variance formula;

the variance formula being:

$$v = \Sigma_{k=1}^{8}(p(k)-m)^2/8;$$

an ROI region determination submodule, which is configured to: if the variance v is less than a preset third threshold Tv, determine that the neighborhood belongs to the ROI region.

Further, the head identification module specifically includes:

a concentric circle construction submodule, which is configured to construct concentric circles with each pixel point in each ROI region as a center, the radius of the inner circle of the concentric circles being r and the radius of the outer circle being n×r;

where r=½R, R being the average number of the pixel points from a central point of a head region to the edge of the head region, which is obtained by statistics, 1.2≤n≤1.7;

a pixel value sorting submodule, which is configured to: sort the pixel values of the pixel points taken in the inner circle, and record a sequence ArrayInner formed by the pixel values of the pixel points taken in the region of the inner circle, the length of the sequence ArrayInner being lengthInner, wherein the point of the maximum pixel value has the pixel value of NinnerMax; sort the pixel values of the pixel points taken in the region between the inner circle and the outer circle, and record a sequence ArrayOuter formed by the pixel values of the pixel points taken in the region between the inner circle and the outer circle, the length of the sequence ArrayOuter being lenghtOuter, wherein the point of the minimum pixel value has the pixel value of NouterMin;

wherein the pixel points taken above are uniformly distributed in respective regions, and the number lengthInner of the pixel points taken in the region of the inner circle is equal to the number lengthOuter of the pixel points taken in the region between the inner circle and the outer circle;

a first probability value determination submodule, which is configured to: calculate, in the sequence ArrayOuter, the number of the points whose pixel values are less than NinnerMax as Numb_1; calculate, in the sequence ArrayInner, the number of the points whose pixel values are greater than NouterMin as Numb_2; and calculate, according to a formula, the probability L that the current pixel point belongs to the pixel points in a head region, and record the probability value;

the formula being:

$$L=(lengthInner+lengthOuter-Num\_1-Num\_2)/(lengthInner+lengthOuter);$$

a second probability value determination submodule, which is configured to: increase the radius of the inner circle of the concentric circles to $r_{new}$, $r_{new}=r+r×α$, where α represents an increase rate of the radius r of the inner circle of the concentric circles, 0<α<1, at this time, the radius of the outer circle being n×rnew; when $r_{new}≤2R$, set $r=r_{new}$ and return to the pixel value sorting submodule to calculate the probability that each pixel point in the ROI region belongs to the pixel points in a head region, and record the probability value; take a recorded maximum probability of each pixel point as the final probability that the current pixel point belongs to the pixel points in the head region; and, when $r_{new}>2R$, enter the head identification module.

The head identification module is configured to: compare the final probability of each pixel point with the first threshold, and filter the pixel points with the final probability smaller than the first threshold, wherein the rest pixel points existent in regional form are points of the head region, and each region is an identified head.

Compared with existing technologies, the disclosure has beneficial effects as follows. According to the pedestrian head identification method and system provided by the disclosure, in one aspect, before the identification of heads, ROI regions are first defined in the foreground image to lock the potential regions of the heads, so that the calculation amount of the algorithm is effectively reduced and the speed of identification is increased; in another aspect, by virtue of the feature that only the head region of a human body has concentric circles properties, concentric circles are constructed to determine a head region, so that the head identification accuracy is improved; in addition, impacts caused to the identification of the heads by clothing color, hair color and the like are effectively avoided, and the anti-interference capability of the algorithm is improved.

DESCRIPTION OF THE EMBODIMENTS

The purpose, the technical scheme and the advantages of the disclosure will become more clearly understood from the detailed description of the disclosure below taken in conjunction with accompanying drawings and embodiments. It should be understood that the specific embodiments described below are merely to illustrate, but to limit, the disclosure.

The main implementation idea of the disclosure is as follows. A depth image of a target region is collected using a depth camera, and a foreground image is extracted from the depth image by background modeling. By virtue of the feature that the head region is relatively flat, potential regions of all heads are extracted from the foreground image to serve as ROI regions. In each ROI region, by virtue of the feature that the distance from the head region to the depth camera (that is, the pixel value) is less than that from the shoulder and other body parts to the depth camera, concentric circles are constructed to identify the head of a pedestrian. Specifically, concentric circles are constructed with the pixel point in the head region as a center; by virtue of the feature that the pixel values of the pixel points in the inner circle generally are smaller than the pixel values of the pixel points between the inner circle and the outer circle, concentric circles are constructed with each point in the ROI region as a center to calculate a probability that the current pixel point belongs to the head region, then the probability is compared with a preset first threshold, and finally the pixel points with the probability smaller than the first threshold are filtered, wherein the rest pixel points existent in regional form are points of the head region, and each region is an identified head.

Figure 1:
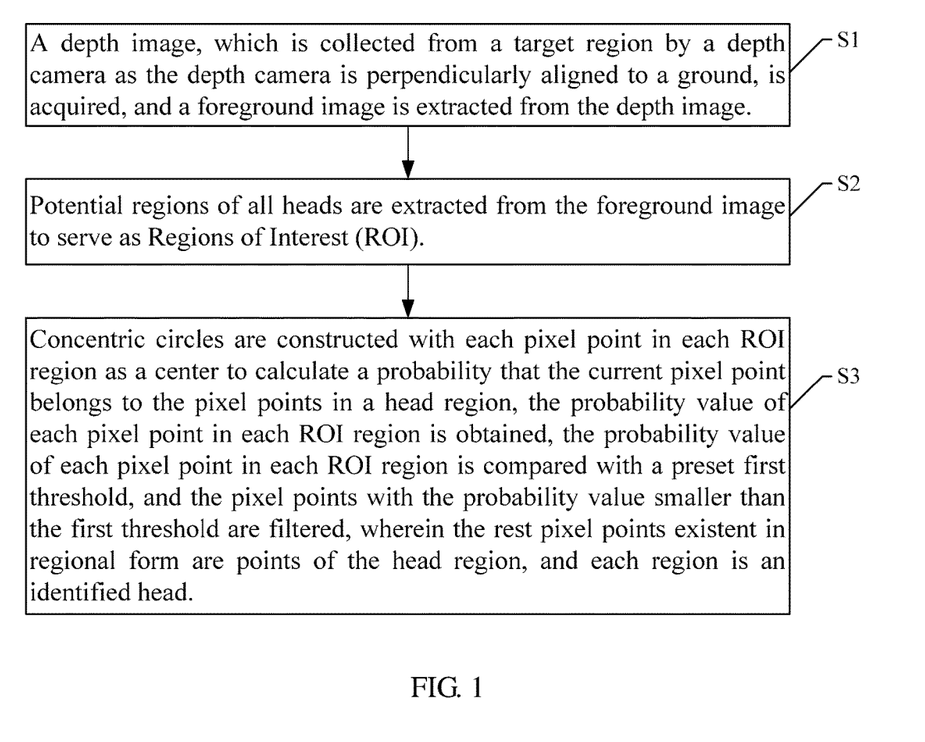
FIG. 1 is a flowchart of a pedestrian head identification method provided by an embodiment of the disclosure.

The pedestrian head identification method is illustrated below in detail. As shown in FIG. 1, the method includes the following steps.

S1: a depth image, which is collected from a target region by a depth camera as the depth camera is perpendicularly aligned to a ground, is acquired, and a foreground image is extracted from the depth image.

Specifically, the camera employed to collect the image of the target region is a depth camera in the disclosure. The imaging principle is to send light pulses continuously to the target region, then receive the light returned from the target region using a sensor, and finally obtain the distance to the target object by detecting the round trip time of the light pulses. The image formed by the depth camera is a relative-distance image, that is, the value of each pixel point in the image is a relative distance between the target and the depth camera. In order to avoid the shielding between pedestrians, the shooting angle of the depth camera is perpendicularly aligned to the ground, thereby effectively reducing the shielding between pedestrians.

The step S1 specifically includes that: the depth image of the target region is collected using the depth camera which is perpendicularly aligned to the ground, a pixel value f(x,y) of a point with coordinates of (x,y) in the depth image is obtained, the pixel value f(x,y) is compared with a pixel value bg(x,y) of a point with coordinates of (x,y) that is obtained by background modeling in advance, and a pixel value mask(x,y) of a point with coordinates of (x,y) in the foreground image is obtained in combination with a formula.

The formula is:

$$\text{mask}(x, y) = \begin{cases} 0 & |f(x, y) - bg(x, y)| < Tbg \\ f(x, y) & \text{others} \end{cases};$$

where Tbg is a distinguishing threshold for the background model and the foreground image, that is, the pixel points, belonging to the background image, in mask(x,y) are set to have a value of 0, and the points, whose pixel values are not 0, in mask(x,y) are the points in the foreground image.

Specifically, the above process of obtaining the pixel value bg(x,y) of the point with coordinates of (x,y) by background modeling in advance includes that: a plurality of background images of the target region are collected, and the pixel values of the point with coordinates of (x,y) in the plurality of background images are averaged to obtain a background model bg(x,y) for the target region, where (x,y) represents the coordinates in the image; the pixel value of the point with coordinates of (x,y) is a relative distance between a corresponding point of the current point in the target region and the depth camera.

Specifically, the above target region is a to-be-detected region in the range that the depth camera is able to collect, and the relative distance between some point in the target region and the depth camera is taken as the pixel value of the current point.

S2: potential regions of all heads are extracted from the foreground image to serve as Regions of Interest (ROI).

Specifically, since the head region is relatively flat, the pixel points of the head region in the depth image have relatively approximated values, that is, the variance of the region is relatively small. Thus, a region with flat pixel values in the image is defined as an ROI region. The ROI region represents a potential head region. The subsequent head identification is carried out on the ROI region. The determination of the ROI region reduces the workload for the subsequent head distinguishing.

The step S2 specifically includes the following steps.

S21: each pixel point P in the foreground image is taken as a central point to calculate, according to a formula, an average m of the pixel values of the points in eight neighborhoods thereof.

Specifically, the eight neighborhoods take one pixel point as a central point; the adjacent eight pixel points of the central point form the eight neighborhoods of the central point.

The formula is:

$$m = \frac{\sum_{k=1}^{8} p(k)}{8};$$

where p(k) is the pixel value of the point in the neighborhood.

S22: if the absolute value d of the difference between the average m of the neighborhood and the pixel value p of the central point is less than a preset second threshold Tm, a variance v of the neighborhood is calculated according to a variance formula.

Herein, d=|p−m|;

The variance formula is:

$$v = \sum_{k=1}^{8} (p(k) - m)^2 / 8.$$

S23: if the variance v is less than a preset third threshold Tv, the neighborhood is determined to belong to the ROI region.

Specifically, each pixel point P in the foreground image is judged according to the above process, so that all ROI regions in the foreground image may be extracted.

S3: concentric circles are constructed with each pixel point in each ROI region as a center to calculate a probability that the current pixel point belongs to the pixel points in a head region, the probability value of each pixel point in each ROI region is obtained, the probability value of each pixel point in each ROI region is compared with a preset first threshold, and the pixel points with the probability value smaller than the first threshold are filtered, wherein the rest pixel points existent in regional form are points of the head region, and each region is an identified head.

In fact, no matter what gesture the pedestrian keeps, the head region is always the highest region of the body. According to the imaging principle of the depth camera, the pixel values of the head region are smaller than those of other regions of the body; therefore, by virtue of this feature, the identification of head may be realized by constructing concentric circles on the foreground image.

The step S3 specifically includes the following steps.

S31: concentric circles are constructed with each pixel point in each ROI region as a center, the radius of the inner circle of the concentric circles being r and the radius of the outer circle being n×r.

Herein, r=½R, R is the average number of the pixel points from a central point of a head region to the edge of the head region, which is obtained by statistics, 1.2≤n≤1.7.

Specifically, the method of obtaining, by statistics, the average number of the pixel points from the central point of the head region to the edge of the head region is: perpendicularly shooting, using a depth camera, a large number of images that show pedestrians pass through a shooting area; calculating the radiuses of the head regions of the pedestrians from the large number of pedestrian images, that is, the number of the pixel points from the central point of the head region to the edge of the head region (the number of the pixel points is called the radius of the head region); and averaging the radiuses of the head regions that are calculated to obtain an average radius R of the head regions. Half of the above average radius R of the head regions is the radius of the inner circle of the concentric circles, that is, the radius of the inner circle is r=½R, the radius of the outer circle is n times the radius of the inner circle, that is, the radius of the outer circle is n×r. Within certain range, the bigger the n is, the stricter the determination criterion is.

S32: the pixel values of the pixel points taken in the inner circle are sorted, and a sequence ArrayInner formed by the pixel values of the pixel points taken in the region of the inner circle is recorded, the length of the sequence ArrayInner being lengthInner, wherein the point of the maximum pixel value has the pixel value of NinnerMax; the pixel values of the pixel points taken in the region between the inner circle and the outer circle are sorted, and a sequence ArrayOuter formed by the pixel values of the pixel points taken in the region between the inner circle and the outer circle is recorded, the length of the sequence ArrayOuter being lenghtOuter, wherein the point of the minimum pixel value has the pixel value of NouterMin.

Herein, the pixel points taken above are uniformly distributed in respective regions, and the number lengthInner of the pixel points taken in the region of the inner circle is equal to the number lengthOuter of the pixel points taken in the region between the inner circle and the outer circle.

S33: in the sequence ArrayOuter, the number of the points whose pixel values are less than NinnerMax is calculated as Numb_1; in the sequence ArrayInner, the number of the points whose pixel values are greater than NouterMin is calculated as Numb_2; and the probability L that the current pixel point belongs to the pixel points in a head region is calculated according to a formula, and the probability value is recorded.

The formula is:

$$L=(\text{lengthInner}+\text{lengthOuter}-\text{Num\_1}-\text{Num\_2})/(\text{lengthInner}+\text{lengthOuter}).$$

If NinnerMax<NouterMin, the probability is directly recorded as 1, because Num_1=0.

If NinnerMax>NouterMin, the probability is calculated according to the formula $$L=(\text{lengthInner}+\text{lengthOuter}-\text{Num\_1}-\text{Num\_2})/(\text{lengthInner}+\text{lengthOuter}).$$

The above method of calculating, using concentric circles, the probability that some point belongs to a head region is illustrated below by taking two specific embodiments as examples.

Embodiment 1 supposing 1, 2, 3, 4, 5 are values of the pixel points in the inner circle, 7, 8, 9, 10, 11 are values of the pixel points between the inner circle and the outer circle, then the point of the maximum pixel value in the inner circle has the value of 5, and the point of the minimum pixel value between the inner circle and the outer circle has the value of 7, since 5<7, the probability is 1.

Embodiment 2 supposing 4, 56, 78, 100, 234, 500 are values of the pixel points in the inner circle, 98, 123, 466, 700, 877, 100 are values of the pixel points between the inner circle and the outer circle, then the point of the maximum pixel value in the inner circle has the value of 500, and the point of the minimum pixel value between the inner circle and the outer circle has the value of 98, since 500>98, the probability is (6+6−3−3)/(6+6)=0.5.

S34: the radius of the inner circle of the concentric circles is increased to $r_{new}$, $r_{new}=r+r\times\alpha$, where α represents an increase rate of the radius r of the inner circle of the concentric circles, 0<α<1, at this time, the radius of the outer circle being n×rnew; when $r_{new}\leq 2R$, $r=r_{new}$ is set and the above steps S32 to S34 is repeated to calculate the probability that each pixel point in the ROI region belongs to the pixel points in a head region, and the probability value is recorded; a recorded maximum probability of each pixel point is taken as the final probability that the pixel point belongs to the pixel points in the head region, thereby a probability graph is obtained, in which the probability value of each point represents the probability that the current point belongs to the head region; when $r_{new}>2R$, go to step S35.

S35: the final probability of each pixel point is compared with the first threshold, and the pixel points with the final probability smaller than the first threshold are filtered, wherein the rest pixel points existent in regional form are points of the head region, and each region is an identified head.

Figure 2:
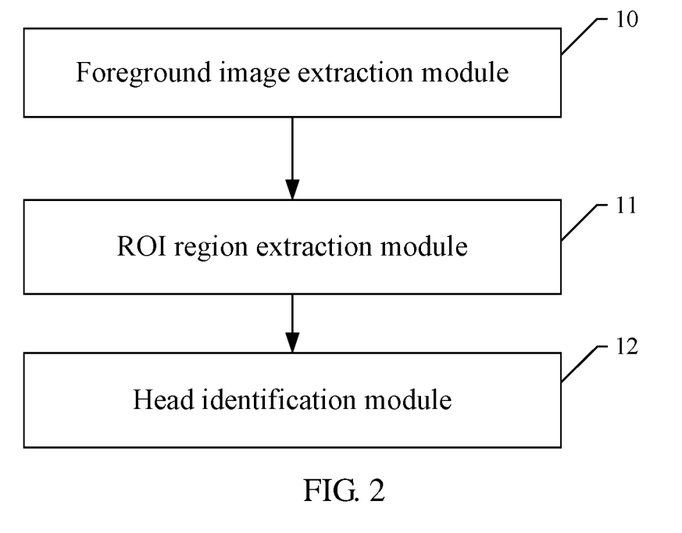
FIG. 2 is a module diagram of a pedestrian head identification system provided by an embodiment of the disclosure.

A pedestrian head identification system is illustrated below. As shown in FIG. 2, the system includes the following modules.

A foreground image extraction module 10, which is configured to acquire a depth image collected from a target region by a depth camera as the depth camera is perpendicularly aligned to a ground and to extract a foreground image from the depth image.

The foreground image extraction module 10 is specifically configured to: collect the depth image of the target region using the depth camera which is perpendicularly aligned to the ground, obtain a pixel value f(x,y) of a point with coordinates of (x,y) in the depth image, compare the pixel value f(x,y) with a pixel value bg(x,y) of a point with coordinates of (x,y) that is obtained by background modeling in advance, and obtain, in combination with a formula, a pixel value mask(x,y) of a point with coordinates of (x,y) in the foreground image.

Herein, the formula is:

$$\text{mask}(x, y) = \begin{cases} 0 & |f(x, y) - bg(x, y)| < Tbg \\ f(x, y) & \text{others} \end{cases};$$

where Tbg is a distinguishing threshold for the background model and the foreground image;

The above process of obtaining the pixel value bg(x,y) of the point with coordinates of (x,y) by background modeling in advance specifically includes: collecting a plurality of background images of the target region, and averaging the pixel values of the point with coordinates of (x,y) in the plurality of background images.

The pixel value of the point with coordinates of (x,y) is a relative distance between a corresponding point of the current point in the target region and the depth camera.

An ROI region extraction module 11, which is configured to extract potential regions of all heads from the foreground image to serve as ROI regions.

The ROI region extraction module 11 specifically includes the following submodules.

An average calculation submodule, which is configured to take each pixel point P in the foreground image as a central point to calculate, according to a formula, an average m of the pixel values of the points in eight neighborhoods thereof.

The formula is:

$$m = \frac{\sum_{k=1}^{8} p(k)}{8}.$$

where p(k) is the pixel value of the point in the neighborhood.

A variance calculation submodule, which is configured to: if the absolute value d of the difference between the average m of the neighborhood and the pixel value p of the central point is less than a preset second threshold Tm, calculate a variance v of the neighborhood according to a variance formula.

Herein, d=|p−m|.

The variance formula is:

$$v = \Sigma_{k=1}^{8}(p(k)-m)^2/8.$$

An ROI region determination submodule, which is configured to: if the variance v is less than a preset third threshold Tv, determine that the neighborhood belongs to the ROI region.

A head identification module 12, which is configured to identify a head region by constructing concentric circles, more specifically, to construct concentric circles with each pixel point in each ROI region as a center to calculate a probability that the current pixel point belongs to the pixel points in a head region, obtain the probability value of each pixel point in each ROI region, compare the probability value of each pixel point in each ROI region with a preset first threshold, and filter the pixel points with the probability value smaller than the first threshold, wherein the rest pixel points existent in regional form are points of the head region, and each region is an identified head.

The head identification module 12 specifically the following submodules.

A concentric circle construction submodule, which is configured to construct concentric circles with each pixel point in each ROI region as a center, the radius of the inner circle of the concentric circles being r and the radius of the outer circle being n×r;

Herein, r=½R, R is the average number of the pixel points from a central point of a head region to the edge of the head region, which is obtained by statistics, 1.2≤n≤1.7;

A pixel value sorting submodule, which is configured to: sort the pixel values of the pixel points taken in the inner circle, and record a sequence ArrayInner formed by the pixel values of the pixel points taken in the region of the inner circle, the length of the sequence ArrayInner being lengthInner, wherein the point of the maximum pixel value has the pixel value of NinnerMax; sort the pixel values of the pixel points taken in the region between the inner circle and the outer circle, and record a sequence ArrayOuter formed by the pixel values of the pixel points taken in the region between the inner circle and the outer circle, the length of the sequence ArrayOuter being lenghtOuter, wherein the point of the minimum pixel value has the pixel value of NouterMin.

Herein, the pixel points taken above are uniformly distributed in respective regions, and the number lengthInner of the pixel points taken in the region of the inner circle is equal to the number lengthOuter of the pixel points taken in the region between the inner circle and the outer circle.

A first probability value determination submodule, which is configured to: calculate, in the sequence ArrayOuter, the number of the points whose pixel values are less than NinnerMax as Numb_1; calculate, in the sequence ArrayInner, the number of the points whose pixel values are greater than NouterMin as Numb_2; and calculate, according to a formula, the probability L that the current pixel point belongs to the pixel points in a head region, and record the probability value.

Herein, the formula is:

$L=$(lengthInner+lengthOuter−Num_1−Num_2)/ (lengthInner+lengthOuter).

A second probability value determination submodule, which is configured to: increase the radius of the inner circle of the concentric circles to $r_{new}$, $r_{new}=r+r\times\alpha$, where $\alpha$ represents an increase rate of the radius r of the inner circle of the concentric circles, $0<\alpha<1$, at this time, the radius of the outer circle being n×rnew; when $r_{new} \leq 2R$, set $r=r_{new}$ and return to the pixel value sorting submodule to calculate the probability that each pixel point in the ROI region belongs to the pixel points in a head region, and record the probability value; take a recorded maximum probability of each pixel point as the final probability that the current pixel point belongs to the pixel points in the head region; and, when $r_{new} > 2R$, enter the head identification module.

The head identification module is configured to: compare the final probability of each pixel point with the first threshold, and filter the pixel points with the final probability smaller than the first threshold, wherein the rest pixel points existent in regional form are points of the head region, and each region is an identified head.

After pedestrian heads are identified by the above pedestrian head identification method, pedestrian flow statistical services may be provided in conjunction with a counting method for densely populated public places such as shopping malls, airports, bus stops and subway stations. A pedestrian flow statistical method is illustrated below in detail. The pedestrian flow statistical method is implemented based on the above pedestrian head identification system. The pedestrian flow statistical method is: tacking the pedestrian head regions identified by the pedestrian head identification system to determine the motion tracks thereof; and, when the motion tracks pass through a preset region, counting the heads so as to calculate the pedestrian flow of the target region.

Figure 3:
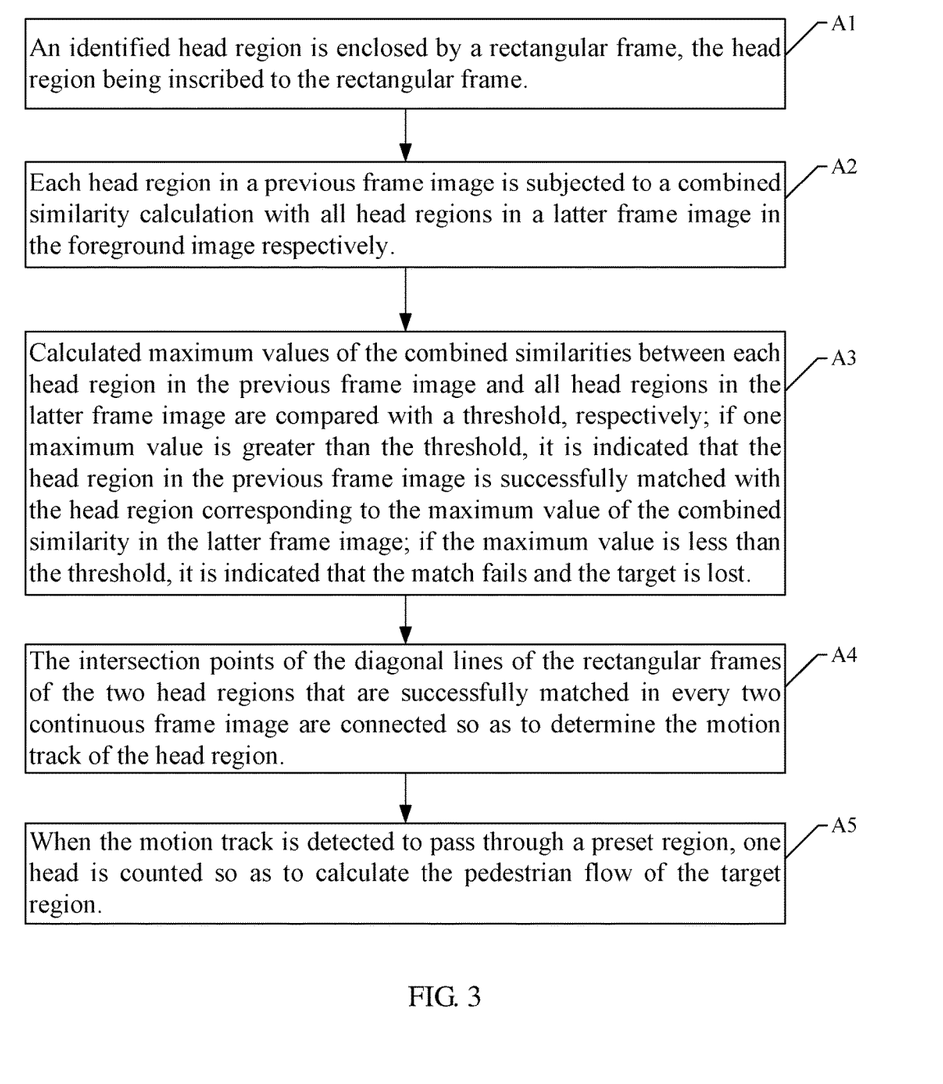
FIG. 3 is a flowchart of a pedestrian flow statistical method provided by an embodiment of the disclosure.

As shown in FIG. 3, the pedestrian flow statistical method specifically includes the following steps.

Step A1: an identified head region is enclosed by a rectangular frame, the head region being inscribed to the rectangular frame.

Step A2: each head region in a previous frame image is subjected to a combined similarity calculation with all head regions in a latter frame image in the foreground image respectively.

Specifically, since the position and area of the head region will not have a drastic change in two continuous frames, the tracking of the head target is determined by calculating the combined similarity, between the two continuous frames, in the position coordinates of the intersection point of the diagonal lines of the rectangular frame of the head and in the area size of the head region.

The calculation formula is:

$$P_{associate}(d1,d2) = A_{position}(d1,d2) A_{area}(d1,d2).$$

Herein, d1 and d2 represent any one of the head regions in the two continuous frame images, respectively; $P_{associate}(d1,d2)$, $A_{position}(d1,d2)$ and $A_{area}(d1,d2)$ represent the combined similarity, the position similarity and the area similarity, respectively; wherein the calculation formulas of $A_{position}$(d1, d2) and $A_{area}$ (d1,d2) are as follows.

$$A_{area}(d1, d2) = \exp\left[-\frac{(s_1 - s_2)^2}{a_s^2}\right],$$

$$A_{position}(d1, d2) = \exp\left[-\frac{(x_1 - x_2)^2}{a_x^2}\right]\exp\left[-\frac{(y_1 - y_2)^2}{a_y^2}\right].$$

Herein, $(x_1,y_1)$ and $(x_2,y_2)$ represent the coordinates of the intersection point of the diagonal lines of any one of the head regions d1 and d2 in the two continuous frame images, respectively; $s_1$ and $s_2$ represent the area of any one of the head regions d1 and d2 in the two continuous frame images, respectively; $a_x$ and $a_y$ represent the variances of the coordinates of the intersection points of the diagonal lines of the rectangular frames of all head regions in the two continuous frame image in X axis and Y axis, respectively; $a_s$ represents the variance of the areas of all head regions in the two continuous frame images.

Step A3: calculated maximum values of the combined similarities between each head region in the previous frame image and all head regions in the latter frame image are compared with a threshold, respectively; if one maximum value is greater than the threshold, it is indicated that the head region in the previous frame image is successfully matched with the head region corresponding to the maximum value of the combined similarity in the latter frame image; if the maximum value is less than the threshold, it is indicated that the match fails and the target is lost.

Step A4: the intersection points of the diagonal lines of the rectangular frames of the two head regions that are successfully matched in every two continuous frame image are connected so as to determine the motion track of the head region.

Step A5: when the motion track is detected to pass through a preset region, one head is counted so as to calculate the pedestrian flow of the target region.

Specifically, the preset region is two parallel virtual determination lines L1 and L2 that are set on the frame image of the foreground image and regions formed by the determination lines and the edge of the foreground image. When the motion track is detected to continuously pass through L1 and L2, a pedestrian counter counts the head. More specifically, when the motion track is detected to continuously pass through L1 and L2 in sequence, an exit counter counts the head; when the motion track is detected to continuously pass through L2 and L1 in sequence, an entry counter counts the head. The motion tracks of all head regions are detected and counted using the above method, and results of the exit counter and entry counter are output in real time.

Herein, the distance between L1 and L2 is twice the length of the top region of a standard adult head, and the middle line between L1 and L2 is the middle line of the frame image.

A pedestrian flow statistical system is illustrated below in detail. The pedestrian flow statistical system is implemented based on the above pedestrian head identification system. The pedestrian flow statistical system is configured to: tack the head regions identified by the pedestrian head identification system to determine the motion tracks thereof; and, when the motion tracks pass through a preset region, count the heads so as to calculate the pedestrian flow of the target region.

Figure 4:
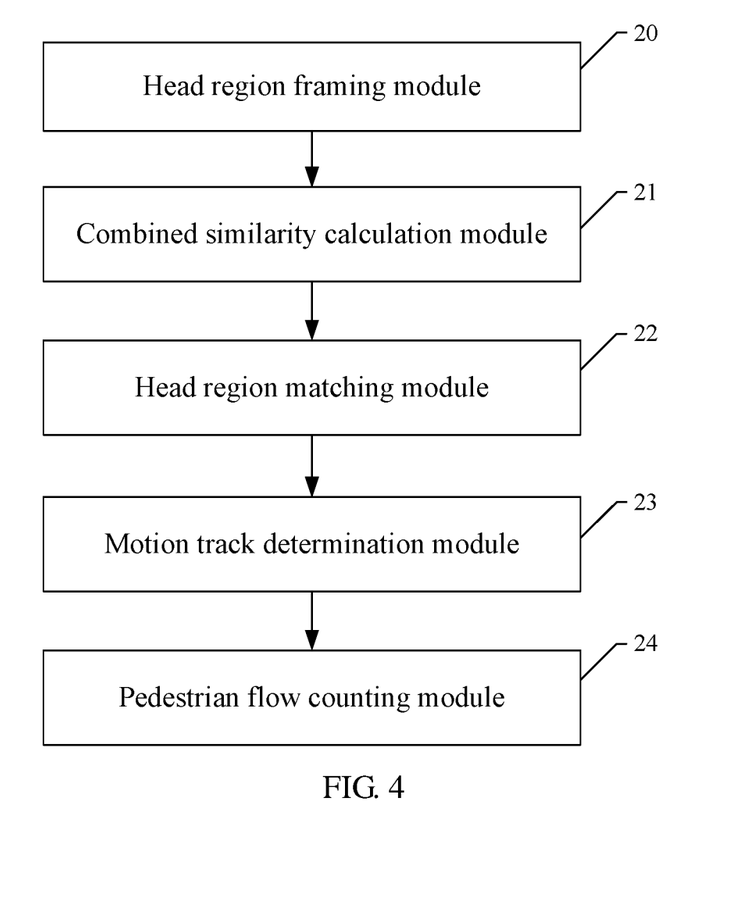
FIG. 4 is a module diagram of a pedestrian flow statistical system provided by an embodiment of the disclosure.

As shown in FIG. 4, the pedestrian flow statistical system specifically includes the following modules.

A head region framing module 20, which is configured to enclose an identified head region by a rectangular frame, the head region being inscribed to the rectangular frame.

A combined similarity calculation module 21, which is configured to subject each head region in a previous frame image to a combined similarity calculation with all head regions in a latter frame image in the foreground image respectively.

Specifically, the combined similarity refers to the combined similarity, between the two continuous frames, in the position coordinates of the intersection point of the diagonal lines of the rectangular frame of the head and in the area size of the head region.

The calculation formula is:

$P_{associate}(d1,d2) = A_{position}(d1,d2) A_{area}(d1,d2).$

Herein, d1 and d2 represent any one of the head regions in the two continuous frame images, respectively; $P_{associate}$(d1,d2), $A_{position}$(d1,d2) and $A_{area}$(d1,d2) represent the combined similarity, the position similarity and the area similarity, respectively; wherein the calculation formulas of $A_{position}$(d1,d2) and $A_{area}$(d1,d2) are as follows.

$$A_{area}(d1, d2) = \exp\left[-\frac{(s_1 - s_2)^2}{a_s^2}\right],$$

$$A_{position}(d1, d2) = \exp\left[-\frac{(x_1 - x_2)^2}{a_x^2}\right]\exp\left[-\frac{(y_1 - y_2)^2}{a_y^2}\right].$$

Herein, $(x_1,y_1)$ and $(x_2,y_2)$ represent the coordinates of the intersection point of the diagonal lines of any one of the head regions d1 and d2 in the two continuous frame images, respectively; $s_1$ and $s_2$ represent the area of any one of the head regions d1 and d2 in the two continuous frame images, respectively; $a_x$ and $a_y$ represent the variances of the coordinates of the intersection points of the diagonal lines of the rectangular frames of all head regions in the two continuous frame image in X axis and Y axis, respectively; $a_s$ represents the variance of the areas of all head regions in the two continuous frame images.

A head region matching module 22, which is configured to: compare calculated maximum values of the combined similarities between each head region in the previous frame image and all head regions in the latter frame image with a threshold, respectively; if one maximum value is greater than the threshold, it is indicated that the head region in the previous frame image is successfully matched with the head region corresponding to the maximum value of the combined similarity in the latter frame image; if the maximum value is less than the threshold, it is indicated that the match fails and the target is lost.

A motion track determination module 23, which is configured to connect the intersection points of the diagonal lines of the rectangular frames of the two head regions that are successfully matched in every two continuous frame image, so as to determine the motion track of the head region.

A pedestrian flow counting module 24, which is configured to count one head when the motion track is detected to pass through a preset region, so as to calculate the pedestrian flow of the target region.

Specifically, the preset region is two parallel virtual determination lines L1 and L2 that are set on the frame image of the foreground image and regions formed by the determination lines and the edge of the foreground image. When the motion track is detected to continuously pass through L1 and L2, a pedestrian counter counts the head. More specifically, when the motion track is detected to continuously pass through L1 and L2 in sequence, an exit counter counts the head; when the motion track is detected to continuously pass through L2 and L1 in sequence, an entry counter counts the head. The motion tracks of all head regions are detected and counted using the above method, and results of the exit counter and entry counter are output in real time.

Herein, the distance between L1 and L2 is twice the length of the top region of a standard adult head, and the middle line between L1 and L2 is the middle line of the frame image.

With the pedestrian flow statistical method and system provided above, pedestrian flow statistical services may be provided for densely populated places such as airports, shopping malls, and railway stations.

According to the pedestrian head identification method provided by the disclosure, in one aspect, before the identification of heads, ROI regions are first defined in the foreground image to lock the potential regions of the heads, so that the calculation amount of the algorithm is effectively reduced and the speed of identification is increased; in another aspect, by virtue of the feature that only the head region of a human body has concentric circles properties, concentric circles are constructed to determine a head region, so that the head identification accuracy is improved; in addition, impacts caused to the identification of heads by clothing color, hair color and the like are effectively avoided, and the anti-interference capability of the algorithm is improved.

The above are merely the preferred embodiments of the disclosure and not intended to limit the disclosure. Any modification, equivalent substitution and improvement made within the spirit and principle of the disclosure are intended to be included within the scope of protection of the disclosure.

What is claimed is:

1. A pedestrian head identification method, characterized by comprising the following steps of:
    S1: acquiring a depth image collected from a target region by a depth camera as the depth camera is perpendicularly aligned to a ground, and extracting a foreground image from the depth image;
    S2: extracting potential regions of all heads from the foreground image to serve as Regions of Interest (ROI); and
    S3: constructing concentric circles with each pixel point in each ROI region as a center to calculate a probability that the current pixel point belongs to the pixel points in a head region, obtaining the probability value of each pixel point in each ROI region, comparing the probability value of each pixel point in each ROI region with a preset first threshold, and filtering the pixel points with the probability value smaller than the first threshold, wherein the rest pixel points existent in regional form are points of the head region, and each region is an identified head.

2. The pedestrian head identification method according to claim 1, characterized in that: the step S1 specifically comprises collecting the depth image of the target region using the depth camera which is perpendicularly aligned to the ground, obtaining a pixel value f(x,y) of a point with coordinates of (x,y) in the depth image, comparing the pixel value f(x,y) with a pixel value bg(x,y) of a point with coordinates of (x,y) that is obtained by background modeling in advance, and obtaining, in combination with a formula, a pixel value mask(x,y) of a point with coordinates of (x,y) in the foreground image;

the formula being:

$$mask(x, y) = \begin{cases} 0 & |f(x, y) - bg(x, y)| < Tbg \\ f(x, y) & \text{others} \end{cases};$$

where Tbg is a distinguishing threshold for the background model and the foreground image;

the above process of obtaining the pixel value bg(x,y) of the point with coordinates of (x,y) by background modeling in advance specifically comprises: collecting a plurality of background images of the target region, and averaging the pixel values of the point with coordinates of (x,y) in the plurality of background images; and the pixel value of the point with coordinates of (x,y) is a relative distance between a corresponding point of the current point in the target region and the depth camera.

3. The pedestrian head identification method according to claim 1, characterized in that: the step S2 specifically comprises the following steps of:
    S21: taking each pixel point P in the foreground image as a central point to calculate, according to a formula, an average m of the pixel values of the points in eight neighborhoods thereof;

the formula being:

$$m = \frac{\sum_{k=1}^{8} p(k)}{8};$$

where p(k) is the pixel value of the point in the neighborhood;

S22: if the absolute value d of the difference between the average m of the neighborhood and the pixel value p of the central point is less than a preset second threshold Tm, calculating a variance v of the neighborhood according to a variance formula;

the variance formula being:

$$v = \frac{\sum_{k=1}^{8}(p(k) - m)^2}{8};$$

S23: if the variance v is less than a preset third threshold Tv, determining that the neighborhood belongs to the ROI region.

4. The pedestrian head identification method according to claim 1, characterized in that: the step S3 specifically comprises the following steps of:
    S31: constructing concentric circles with each pixel point in each ROI region as a center, the radius of the inner circle of the concentric circles being r and the radius of the outer circle being n×r;

where $$r = \frac{1}{2}R,$$

R being the average number of the pixel points from a central point of a head region to the edge of the head region, which is obtained by statistics, $1.2 \leq n \leq 1.7$;

S32: sorting the pixel values of the pixel points taken in the inner circle, and recording a sequence ArrayInner formed by the pixel values of the pixel points taken in the region of the inner circle, the length of the sequence ArrayInner being lengthInner, wherein the point of the maximum pixel value has the pixel value of NinnerMax; sorting the pixel values of the pixel points taken in the region between the inner circle and the outer circle, and recording a sequence ArrayOuter formed by the pixel values of the pixel points taken in the region between the inner circle and the outer circle, the length of the sequence ArrayOuter being lenghtOuter, wherein the point of the minimum pixel value has the pixel value of NouterMin;

wherein the pixel points taken above are uniformly distributed in respective regions, and the number lengthInner of the pixel points taken in the region of the inner circle is equal to the number lengthOuter of the pixel points taken in the region between the inner circle and the outer circle;

S33: calculating, in the sequence ArrayOuter, the number of the points whose pixel values are less than NinnerMax as Numb_1; calculating, in the sequence ArrayInner, the number of the points whose pixel values are greater than NouterMin as Numb_2; and calculating, according to a formula, the probability L that the current pixel point belongs to the pixel points in a head region, and recording the probability value;

the formula being:

$L$=(lengthInner+lengthOuter−Num_1−Num_2)/(lengthInner+lengthOuter);

S34: increasing the radius of the inner circle of the concentric circles to $r_{new}$, $r_{nes}$=r+r×α, where α represents an increase rate of the radius r of the inner circle of the concentric circles, $0<\alpha<1$, at this time, the radius of the outer circle being n×rnew; when $r_{new} \leq 2R$, setting $r=r_{new}$ and repeating the above steps S32 to S34 to calculate the probability that each pixel point in the ROI region belongs to the pixel points in a head region, and recording the probability value; taking a recorded maximum probability of each pixel point as the final probability that the current pixel point belongs to the pixel points in the head region; and, when $r_{new}>2R$, going to step S35; and S35: comparing the final probability of each pixel point with the first threshold, and filtering the pixel points with the final probability smaller than the first threshold, wherein the rest pixel points existent in regional form are points of the head region, and each region is an identified head.

\* \* \* \* \*